Jan. 14, 1936. E. C. HORTON 2,028,069
MOTOR VEHICLE HEATING AND COOLING SYSTEM
Filed Nov. 14, 1932
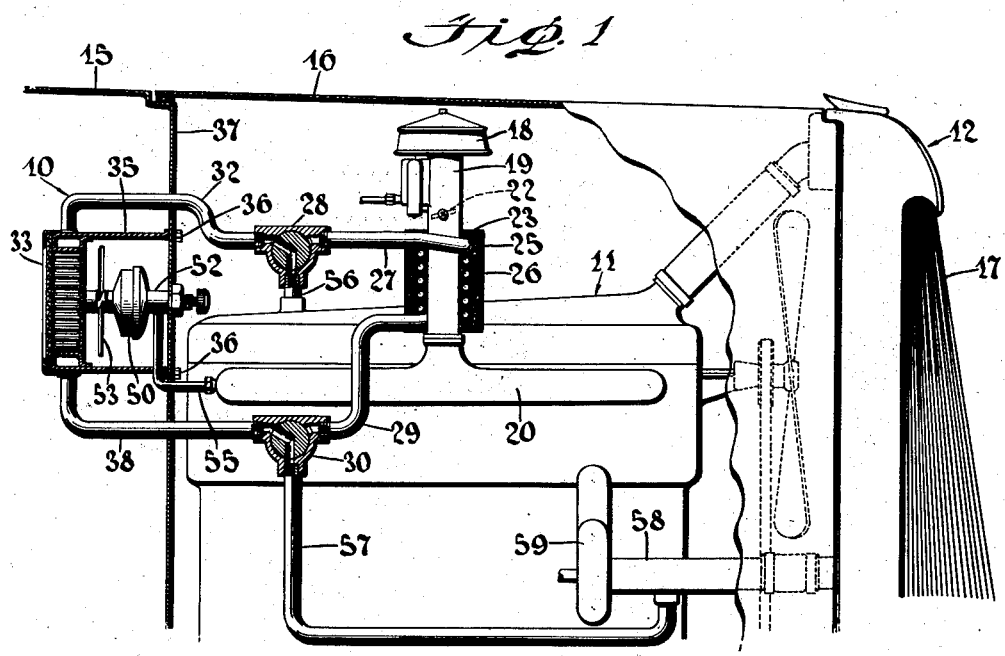
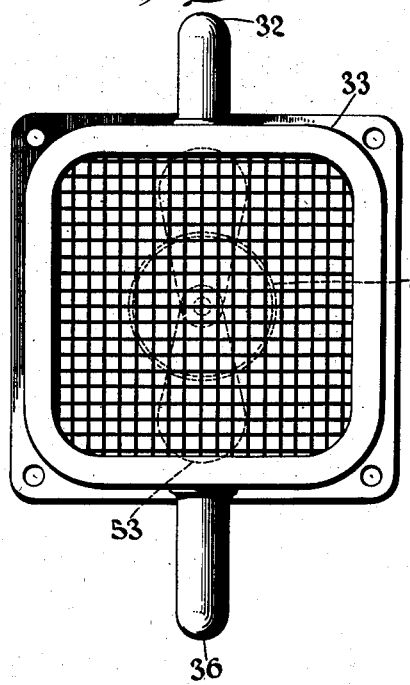
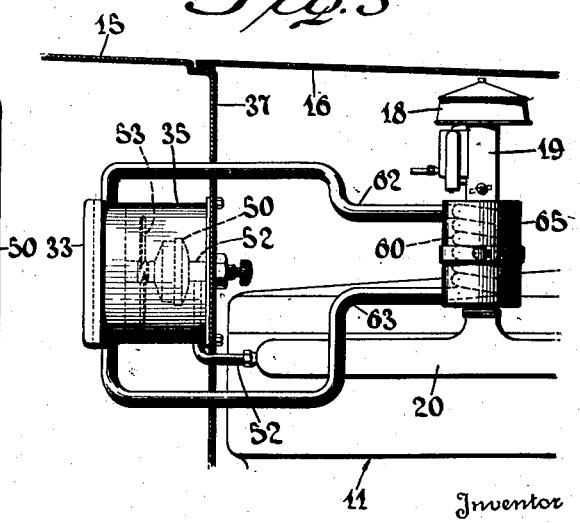
Inventor
Erwin C. Horton
By Bean & Brooks
Attorneys Patented Jan. 14, 1936

2,028,069

UNITED STATES PATENT OFFICE 2,028,069

MOTOR VEHICLE HEATING AND COOLING SYSTEM

Erwin C. Horton, Hamburg, N. Y., assignor to Trico Products Corporation, Buffalo, N. Y.

Application November 14, 1932, Serial No. 642,666

6 Claims. (Cl. 261—10)

This invention relates to heat transfer units for motor vehicles and it has particular relation to a combined heating and cooling system selectively operable by an internal combustion engine.

One object of the invention is to provide a device which is connected to a cooled portion of an internal combustion engine and also to a heated portion of the engine, and which may be selectively placed in communication with either the heated or cooled portions for regulating the temperature in the passenger compartment of the motor vehicle.

Another object of the invention is to utilize the refrigerating characteristics of the portion of the intake manifold adjacent the carburetor for cooling the passenger compartment of a motor vehicle.

In the drawing:

Fig. 1 is a fragmentary view of the front portion of a motor vehicle having a device embodying the invention mounted in conjunction with the engine certain elements of the device being shown in cross-section and others in elevation;

Fig. 2 is a front elevation of a temperature transfer unit in substantially the form of a radiator; and Fig. 3 is an elevation of a device embodying another form of the invention and mounted upon portions of a vehicle shown in cross-section.

The present invention contemplates means for regulating the temperature in passenger compartments of motor vehicles, the term "passenger compartments" being used herein broadly to include compartments of various types, such as for passengers, live stock, storage purposes and the like.

Referring to Figs. 1 and 2, a temperature transfer unit 10 is mounted in conjunction with an internal combustion engine 11 supported in a conventional manner in a motor vehicle 12, a cowl 15, hood 16, and radiator 17, all of which are shown. In the type of engine disclosed herein a so-called down draft carburetor 18 is utilized and communicates by means of a pipe or manifold extension 19 with a conventional intake manifold 20. A throttle 22 is mounted in the pipe 19 for controlling the operation of the engine according to ordinary practice.

In observing the operation of an internal combustion engine, I have found that the changes incidental to the mixture of gas and air in the carburetor and its subsequent passage in properly proportioned form through the pipe 19 into the intake manifold, causes a definite refrigeration about the carburetor and the intake pipe 19. In order to utilize the lower temperature produced about the pipe 19, a casing 23 is mounted thereon in surrounding relation and is provided with a relatively thick lining of heat insulating material 25. A tubular coil 26 is wound spirally about the pipe 19 and its upper end portion 27 extends from the casing for connection to a three-way valve 28.

The valve 28 also communicates with a tube 32 that leads into a cellular structure 33 which serves, in conjunction with this embodiment of the invention, either as a heater or cooler, and is supported in a casing 35 having suitable connections 36 to a downwardly extending flange or cowl wall 37 which separates the engine compartment from the passenger compartment of the vehicle. Another section of tube 38 leading from the heater 33 extends through the wall 37 and is connected to the three-way valve 30.

In order to provide a suitable air circulation about the surfaces of the cellular structure of the heater, a suction turbine 50 is mounted in the casing 35 upon an axial support 52 carried by the latter, and is provided with a fan 53. A tube 55 extending through the casing 35 of the turbine is connected to the intake manifold 20 of the engine. This turbine and fan operate in substantially the same manner as those shown and described in co-pending application Serial No. 627,076, filed July 30, 1932 which has since matured into Patent No. 2,002,319 dated May 21, 1935 for a vehicle cooling system.

The valves 28 and 30 are designed to place the heater or cooler 33 in communication with either the coil 26 or with the water circulation cooling system of the internal combustion engine 11. A tube section 56 is connected to the valve 28 and to the upper portion of the engine that includes its water circulation jacket and a tube 57 is connected to the valve 30 as well as to a conduit 58 leading from the engine radiator 17 to a pump 59 and thence to the body of the engine.

When the valves 28 and 30 are in the positions shown in Fig. 1, the water from the circulating system, in addition to passing through the radiator 17, also circulates through the valve 28 to the heater 33, from the heater to the valve 30, and back to the pump 59 to be recirculated. Thus while the engine is running the fan 53 can also be operated to circulate the heated air from the cellular structure of the heater 33 in the passenger compartment of the vehicle.

By turning the valves to the positions in which they provide communication from the coil connections 27 and 29 to the pipe sections 32 and 38, the water in the tubes is cooled in the coil 26 for circulation through the cellular structure 33 which then serves as a cooler. The latter circulating system serves as a so-called thermo-siphon, that is the tendency of the warmer water to rise provides for proper circulation. Thus it is clear that the structure described operates either to cool the passenger compartment or to heat it, depending upon the circulating cycles controlled by the valves 28 and 30.

In the form of the invention shown in Fig. 3, a coil 60 is mounted upon the intake manifold extension pipe 19 adjacent the carburetor 18 and it has tubular extensions 62 and 63 communicating through and extending from a coil-enclosing casing 65 directly to opposite sides of the cooler 33 without utilizing intermediate valves for communication with the water circulation system of the engine.

This structure serves only as a cooler by reason of the fact that lower temperatures about the tube 19 are transmitted through a heat conducting medium in the coil and its extensions to the cellular cooler 33. Any suitable type of liquid may be employed as the heat conducting medium in the coil. Air is circulated about the cellular structure by the fan 53 in the manner previously described.

Although only the preferred forms of the invention have been shown and described in detail, it will be apparent to those skilled in the art that the invention is not so limited but that various changes may be made therein without departing from the spirit of the invention or from the scope of the appended claims.

What is claimed is:

1. A motor vehicle temperature influencing system comprising, in combination with the carburetor and the intake manifold of an internal combustion engine having a cooled portion, a thermal exchange element disposed about a part of said manifold for cooling said element, a second thermal exchange element for influencing the temperature of the passenger compartment of the vehicle, means connecting said elements for fluid circulation from one element to the other, the temperature of the intake manifold serving to cool the second element through and by virtue of the circulating fluid, and means for circulating air about the second element to cool the vehicle passenger compartment.

2. A motor vehicle temperature influencing system comprising a carburetor connecting member of an internal combustion engine for supplying fuel mixture from the carburetor whereby a refrigerating action is caused about said member, a hollow element disposed about said member for transferring refrigerated atmosphere from said member, a cellular structure for influencing the temperature within the passenger compartment of the vehicle, communicating means between the hollow element and the cellular structure for circulating a thermal transfer medium between them, and means for passing air through the cellular structure.

3. A motor vehicle temperature influencing system comprising an internal combustion engine having an intake manifold and a water circulation cooling system, a heat exchange element for disposition in the passenger compartment of the vehicle, means for withdrawing heat from the heat exchange element and transferring such heat to the manifold extension, means for connecting the water circulation system to the heat exchange element for circulating water therethrough, and means selectively initiating and arresting communication of the water circulating system and the first mentioned means with the heat exchange element.

4. A motor vehicle temperature influencing system comprising a carburetor pipe of an internal combustion engine for supplying fuel mixture from the carburetor, a heat transfer means connected to the pipe, a second heat transfer means in the passenger compartment of the vehicle, means for circulating a heat exchange medium between said first and second heat transfer means, and means for selectively connecting said circulating means to the first transfer means and to a water circulation system of the internal combustion engine whereby said second heat transfer means may constitute either a heating or cooling device having its temperature varying characteristics arising from the operation of the internal combustion engine.

5. In an internal combustion engine of a motor vehicle and provided with an intake manifold and a water cooling system, a heat exchange element for disposition in the passenger compartment of the vehicle, a hollow structure operatively disposed with relation to the intake manifold, means communicating with the heat exchange element and hollow structure for circulating a heat transfer medium therebetween, and valve connections between the water cooling system and said means for selectively connecting said heat exchange element to the cooling system to heat the passenger compartment and to said hollow element to cool the passenger compartment.

6. In an internal combustion engine associated with a motor vehicle and provided with a manifold, a cooling system for the passenger compartment of the motor vehicle, comprising a hollow structure surrounding the intake manifold and disposed in direct contact therewith, a heat exchange element having means for mounting it in the passenger compartment of the motor vehicle, fluid circulating connections between the hollow structure and the heat exchange element, heat insulating means enveloping both the hollow structure and the portion of the intake manifold surrounded thereby, means encasing the insulating means and the hollow structure, and means for circulating air about the heat radiating surfaces of said heat exchange element in the vehicle passenger compartment of the vehicle.

ERWIN C. HORTON.